United States Patent
Ozawa et al.

(10) Patent No.: US 11,845,160 B2
(45) Date of Patent: Dec. 19, 2023

(54) CLEANING DEVICE, CLEANING METHOD, AND MACHINE TOOL

(71) Applicant: FANUC CORPORATION, Yamanashi (JP)

(72) Inventors: Yuuta Ozawa, Yamanashi (JP); Yoshitake Furuya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1084 days.

(21) Appl. No.: 16/670,174

(22) Filed: Oct. 31, 2019

(65) Prior Publication Data
US 2020/0180106 A1    Jun. 11, 2020

(30) Foreign Application Priority Data
Dec. 10, 2018 (JP) .................. 2018-230701

(51) Int. Cl.
| | |
|---|---|
| *B24B 53/00* | (2006.01) |
| *B24B 53/007* | (2006.01) |
| *B08B 3/02* | (2006.01) |
| *B24B 53/017* | (2012.01) |
| *B24B 41/02* | (2006.01) |
| *B08B 17/02* | (2006.01) |

(52) U.S. Cl.
CPC ............ *B24B 53/007* (2013.01); *B08B 3/02* (2013.01); *B08B 17/025* (2013.01); *B24B 41/02* (2013.01); *B24B 53/017* (2013.01)

(58) Field of Classification Search
CPC .................................................. B24B 53/007
See application file for complete search history.

(56) References Cited

U.S. PATENT DOCUMENTS

2010/0310331 A1   12/2010   Inoue et al.
2014/0190530 A1   7/2014   Maeda et al.

FOREIGN PATENT DOCUMENTS

| | | |
|---|---|---|
| CN | 101878091 A | 11/2010 |
| CN | 103707179 A | 4/2014 |
| CN | 204765427 U | 11/2015 |
| CN | 105234742 A | 1/2016 |
| CN | 105983877 A | 10/2016 |
| EP | 2228169 A1 | 9/2010 |
| JP | H02-160464 A | 6/1990 |
| JP | 2000218464 A | 8/2000 |
| JP | 2011-240458 A | 12/2011 |
| JP | 2014-079849 A | 5/2014 |
| TW | M524689 U | 7/2016 |

OTHER PUBLICATIONS

Xing, Yansi; First Office Action; Chinese Patent Application No. 201911235174.5; dated Jun. 15, 2022; 6 pages.

*Primary Examiner* — Jason Y Ko
(74) *Attorney, Agent, or Firm* — Renner, Otto, Boisselle & Sklar, LLP (57) ABSTRACT

A cleaning device arranged in a table which is driven. The cleaning device includes one or more cleaning through holes provided in the table and opened at positions facing a workpiece or a jig, a container unit provided in the table and including a storage space which receives cleaning fluid; a movable member that is arranged in the container unit, that defines the storage space, and that is supported movably in a direction intersecting a horizontal axis line; and a cleaning piping component connecting the storage space and the cleaning through holes.

6 Claims, 6 Drawing Sheets

FIG. 5

CLEANING DEVICE, CLEANING METHOD, AND MACHINE TOOL

CROSS-REFERENCE TO RELATED APPLICATIONS

This application is based on and claims priority to Japanese Patent Application No. 2018-230701 filed on Dec. 10, 2018, the content of which is incorporated herein by reference in its entirety.

TECHNICAL FIELD

The present invention relates to a cleaning device, a cleaning method, and a machine tool.

BACKGROUND ART

In traditionally known cleaning devices and machine tools, after cutting of a workpiece in a machine tool, chips remain on the workpiece and a jig to which the workpiece is fixed and the chips are cleaned off by cutting fluid sprayed from a cleaning nozzle installed inside the machine tool (for example, see PTL 1).

CITATION LIST

Patent Literature

{PTL 1}
Japanese Unexamined Patent Application, Publication No. 2011-240458

SUMMARY OF INVENTION

An aspect of the present invention is a cleaning device arranged in a table to which a jig that supports a workpiece is fixed, the table configured to be rotated about a horizontal axis line, the cleaning device including:
  one or more cleaning through holes provided in the table and opened at positions facing the workpiece or the jig; a container unit provided in the table and including a storage space which receives cleaning fluid; a movable member that is arranged in the container unit, that defines the storage space, and that is supported movably in a direction intersecting the horizontal axis line; and a cleaning piping component connecting the storage space and the cleaning through holes.

Also, yet another aspect of the present invention is a machine tool that includes any one of the above-described cleaning devices.

Also, still another aspect of the present invention is a cleaning method including: storing cleaning fluid in a storage space provided in a table to which a jig supporting a workpiece is fixed; compressing the storage space by a centrifugal force created by rotation of the table about a horizontal axis line; and spraying the cleaning fluid stored in the storage space via one or more cleaning through holes provided in the table, the cleaning through holes opened at positions facing the workpiece or the jig.

DESCRIPTION OF EMBODIMENTS

A cleaning device 6, a cleaning method, and a machine tool 1 according to an embodiment of the present invention will be described hereinbelow with reference to the drawings.

Figure 1:
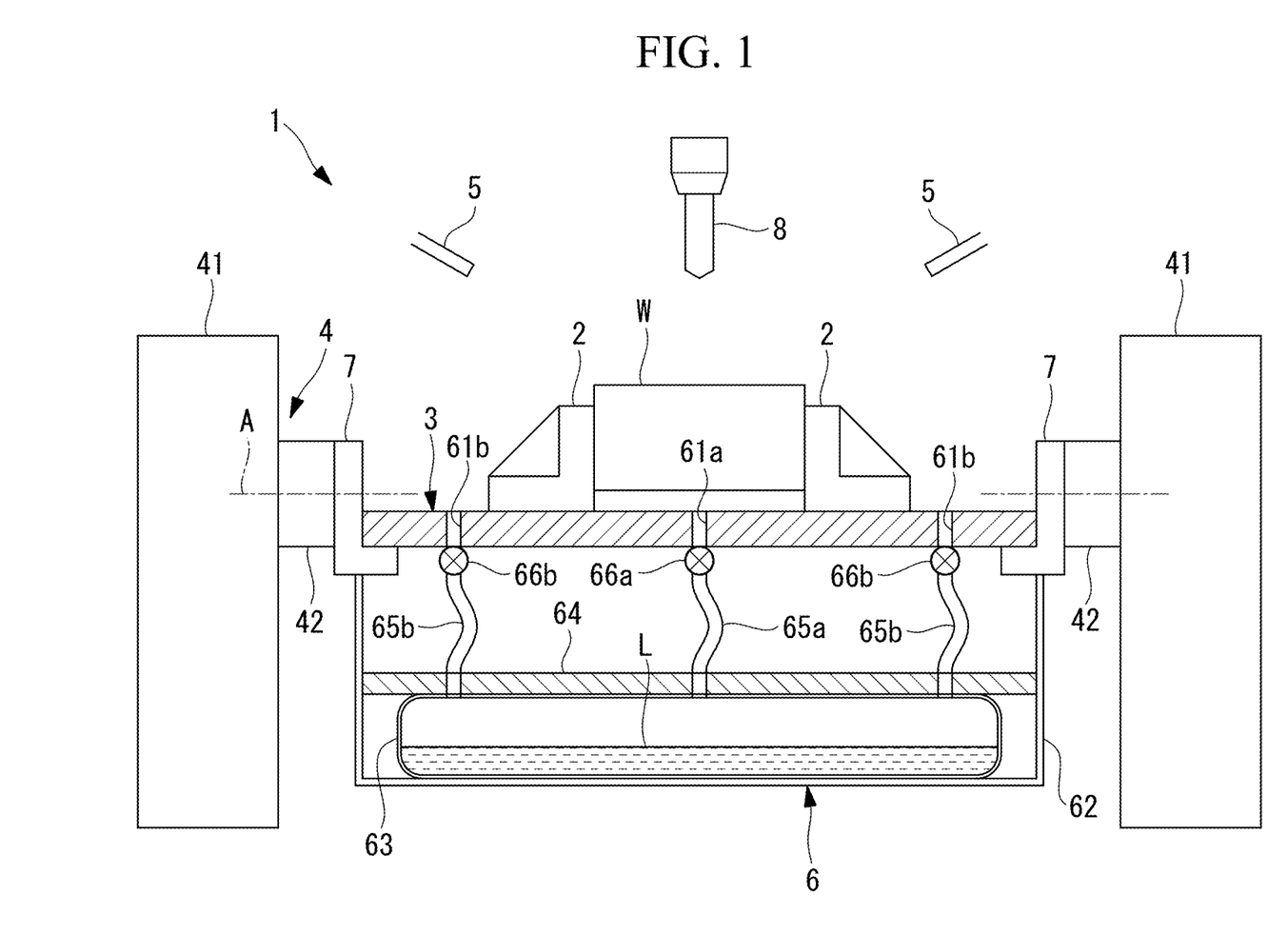
FIG. 1 is a partial internal structure diagram illustrating a machine tool according to an embodiment of the present invention.

The machine tool 1 according to this embodiment includes, as illustrated in FIG. 1, a flat plate-shaped table 3 which fixedly holds a workpiece W by means of a jig 2; a drive unit 4 which drives and rotates the table 3 about a horizontal axis line A; a working tool 8 which is moved toward the workpiece W from above the table 3 to perform cutting on the workpiece W; a cutting fluid nozzle 5 which supplies cutting fluid (cleaning fluid) L to the workpiece W on which the cutting is being performed; and a cleaning device 6 according to this embodiment. In the figures, the reference sign 7 indicates a frame to which the drive unit 4 is fixed.

The drive unit 4 may be a unit obtained by combining a servo motor 41 and a decelerator 42 or may be a direct drive motor.

The cutting fluid nozzle 5 is arranged to be oriented toward the workpiece W at an appropriate position above or at a side of the workpiece W such that the cutting fluid is evenly applied to the entire surface of the workpiece W on which the cutting is being performed.

The cleaning device 6 according to this embodiment includes: a plurality of through holes (cleaning through holes, drainage through holes) 61a, 61b extending through the table 3 in a thickness direction of the table 3; a container unit 62 fixed to a surface of the table 3 opposite to a surface thereof to which the workpiece W is fixed; a rubber bag (sealing part) 63 arranged inside the container unit 62; a flat plate-shaped movable member 64 defining a space (storage space) in which the rubber bag 63 inside the container unit 62 is arranged so that the movable member 64 is movable in directions toward and away from the table 3.

At least any one through hole (cleaning through hole) 61a out of the through holes 61a, 61b is opened at a position so that the one through hole faces a surface of the workpiece W which faces the table 3 when the workpiece W is fixed to the table 3. At least the other one through hole (drainage through hole) 61b out of the through holes 61a, 61b is opened at a position where it is not closed by the workpiece W or the jig 2 when the workpiece W is fixed to the table 3.

Also, the cleaning device 6 includes piping components (a cleaning piping component and a drainage piping component) 65a, 65b extending through the movable member 64 in a thickness direction thereof and connecting the through holes 61a, 61b and the rubber bag 63; and open/close valves (a cleaning valve, drainage valves) 66a, 66b configured to open and close the individual piping components 65a, 65b.

The piping components 65a, 65b are flexible and configured to be bent or extended depending on a change in a distance between the table 3 and the movable member 64 caused by the movement of the movable member 64.

Figure 2:
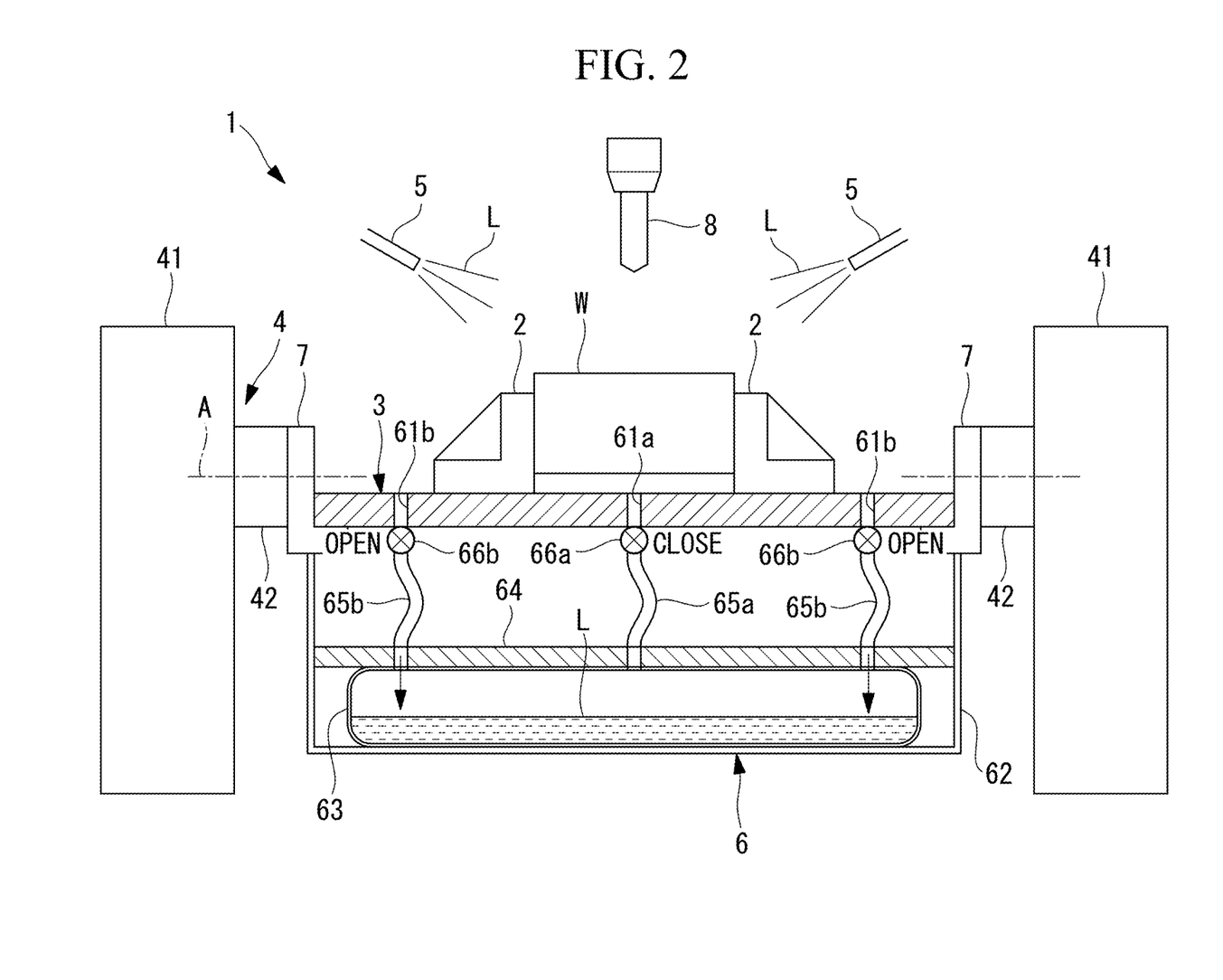
FIG. 2 is a diagram illustrating a state during cutting of a workpiece using the machine tool of FIG. 1.
Figure 3:
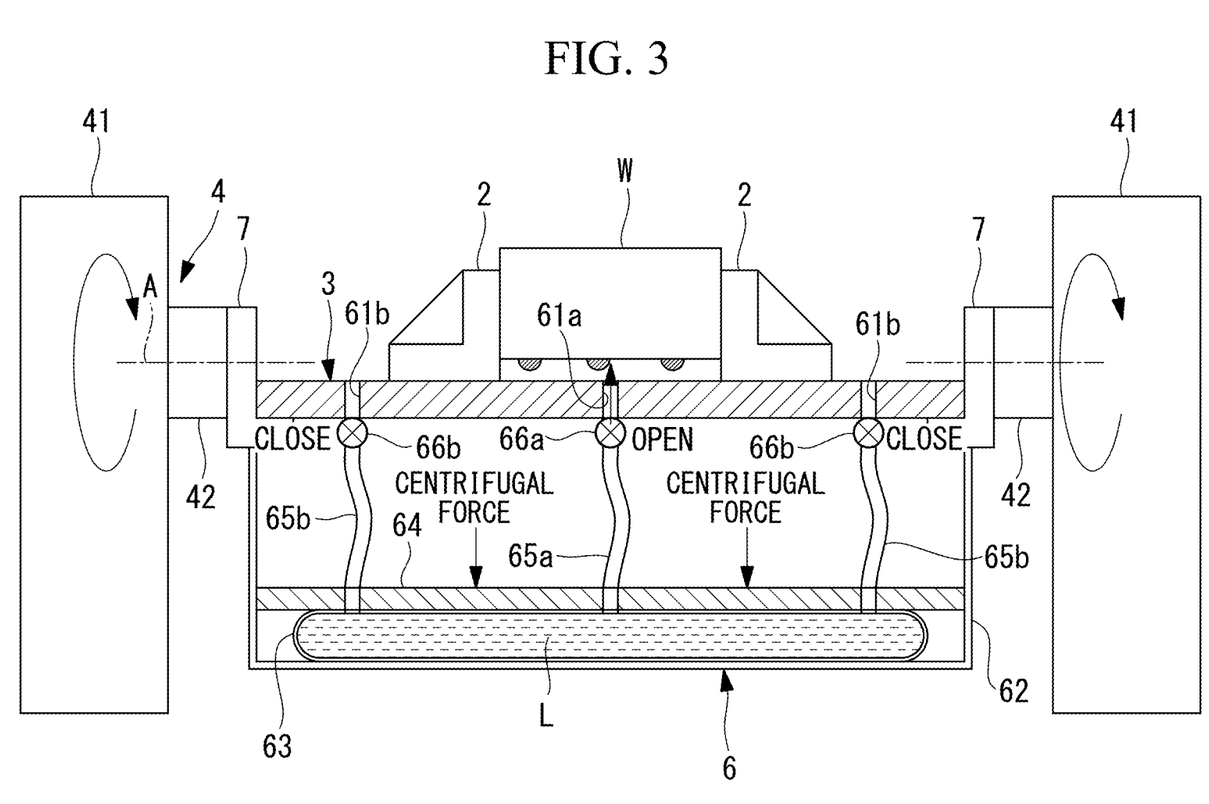
FIG. 3 is a diagram illustrating a state during cleaning of the workpiece using the machine tool of FIG. 1.

The open/close valves 66a, 66b are operated in such a pattern that they open the drainage piping component 65b and close the cleaning piping component 65a at the time of cutting of the workpiece W as illustrated in FIG. 2. On the other hand, as illustrated in FIG. 3, at the time of cleaning of the workpiece W, these valves are operated in such a pattern that they open the cleaning piping component 65a and open the drainage piping components 65b.

A cleaning method using the cleaning device 6 according to this embodiment configured in this manner will be described below.

Figure 4:
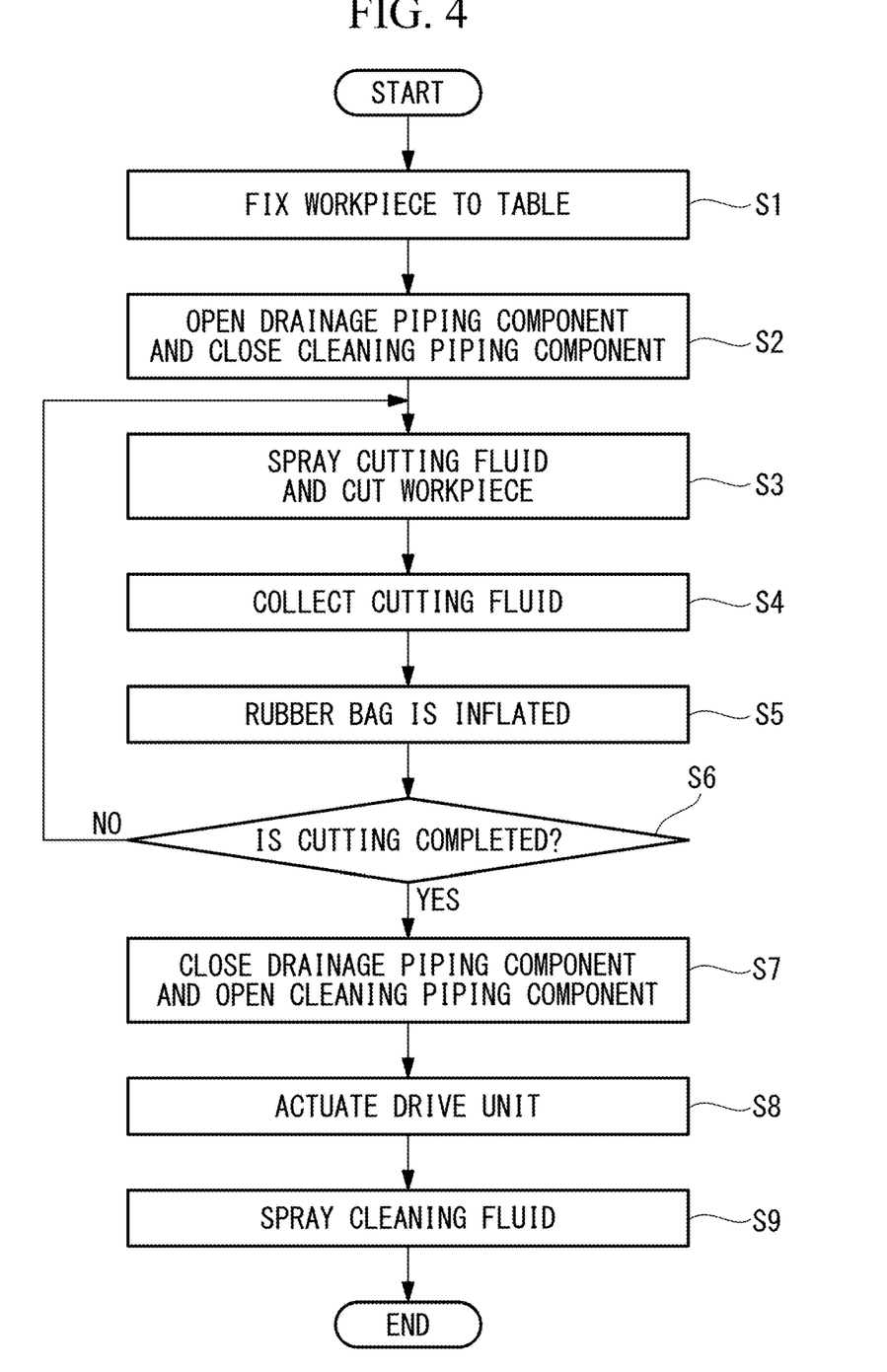
FIG. 4 is a flowchart explaining a workpiece cutting and cleaning method by the machine tool of FIG. 1.

When cutting should be performed on the workpiece W using the machine tool 1 according to this embodiment, the workpiece W is fixed onto the table 3 using the jig 2 as illustrated in FIG. 4 (step S1).

Next, as illustrated in FIG. 2, the open/close valves 66b of the drainage piping components 65b connected to the drainage through holes 61b are kept in an opened state and the open/close valve 66a of the cleaning piping component 65a connected to the cleaning through hole 61a is kept in a closed state (step S2). In addition, the table 3 is placed in a substantially horizontal position or an position inclined by a predetermined angle with respect to the horizontal direction, the cutting fluid L is sprayed via the cutting fluid nozzle 5, and the cutting is performed on the workpiece W by the working tool 8 moved toward the workpiece W from above the workpiece W while cooling and lubrication for the workpiece W is performed (step S3).

As the cutting proceeds, a large amount of the cutting fluid L is sprayed via the cutting fluid nozzle 5, as a result of which the workpiece W is lubricated and the cutting fluid L after the lubrication is received by the table 3, the cutting fluid L then passes through the movable member 64 via the drainage through holes 61b and the drainage piping components 65b opened in the surface of the table 3, and the cutting fluid L is finally discharged into the rubber bag 63 arranged inside the container unit 62 (step S4).

As the cutting fluid L that has been discharged is stored in the rubber bag 63, the rubber bag 63 is inflated and the movable member 64 is moved against its own weight in a direction toward the table 3 (step S5). Whether or not the cutting is completed is determined (step S6) and the opened open/close valves 66b of the drainage piping components 65b is closed and the closed open/close valve 66a of the cleaning piping component 65a is opened at the time point at which the cutting is completed as illustrated in FIG. 3 (step S7).

In addition, the drive unit 4 is actuated and the table 3 and the container unit 62 are rotated at a high speed about the horizontal axis line A (step S8).

As a result, a centrifugal force acts upon the movable member 64 in a direction away from the horizontal axis line A, so that the movable member 64 is moved within the container unit 62 and the rubber bag 63 is pushed.

The cutting fluid L stored in the rubber bag 63 is forced to be pushed out as the cleaning fluid from the rubber bag 63 that has been pushed, passed through the cleaning piping component 65a and the cleaning through hole 61a, and sprayed via the opening in the surface of the table 3 (step S9). Since the opening in the cleaning through hole 61a face the workpiece W or the jig 2, chips adhering to the surface of the workpiece W or the jig 2 can be cleaned off.

In other words, since the cutting fluid nozzle 5 is arranged above or at the side of the workpiece W and the surface of the table 3 to which the workpiece W is fixed is covered by the table 3, the cutting fluid L that has been sprayed via the cutting fluid nozzle 5 is hardly applied onto the surface of the workpiece W on the side of the table 3 or the jig 2 and chips are likely to remain there. In contrast, according to this embodiment, since the cleaning fluid, which is the cutting fluid L, is sprayed via the cleaning through hole 61a provided in the table 3, an advantageous effect can be achieved that the chips after the cutting which are likely to remain below the workpiece W and the jig 2 can be efficiently cleaned off.

It should be noted that, while the open/close valve 66a of the cleaning piping component 65a connected to the cleaning through hole 61a is kept in the closed state at the time of the cutting in this embodiment, it may also be placed in an opened state so that the cleaning through hole 61a is also used to collect the cutting fluid L.

Figure 5:
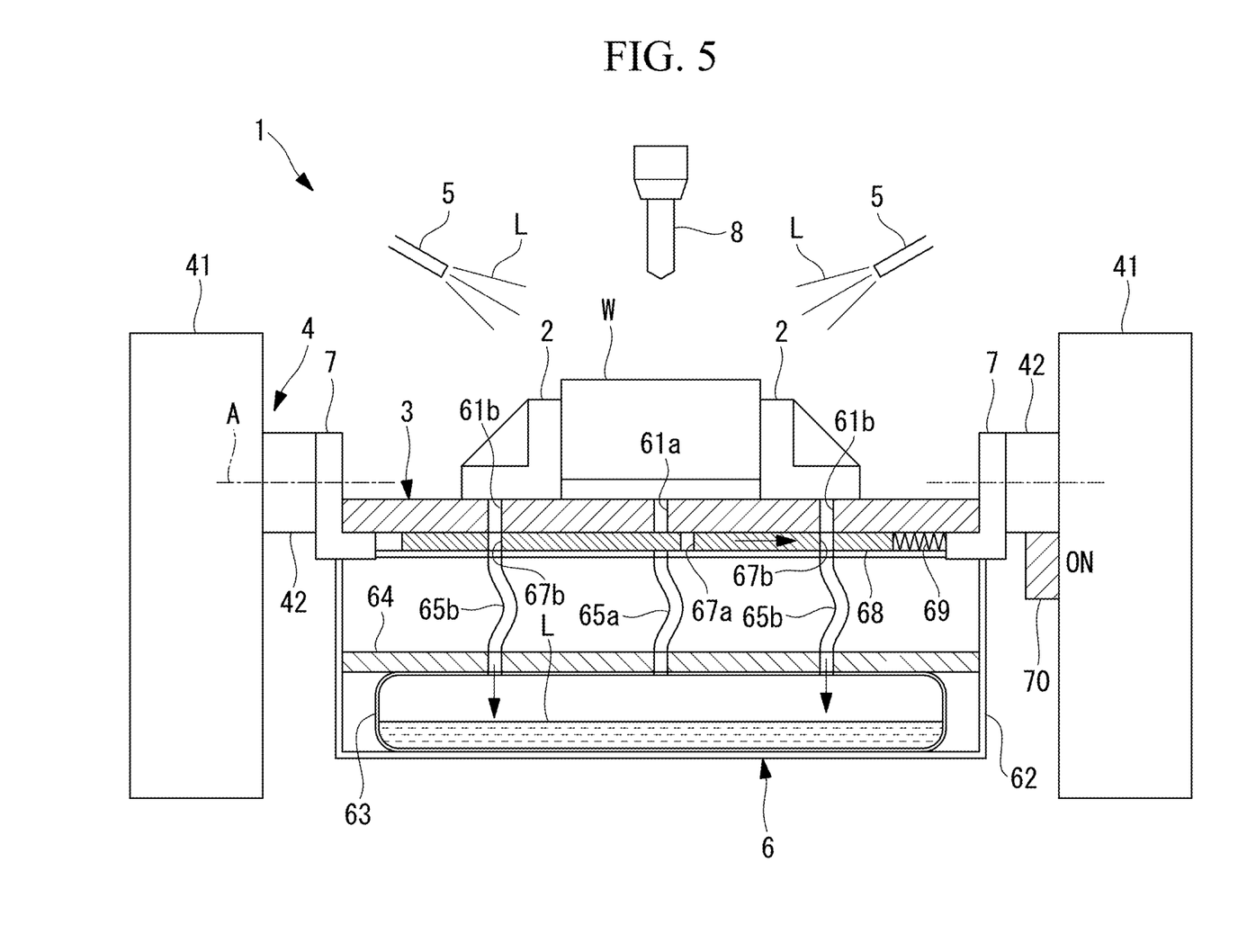
FIG. 5 is a diagram illustrating a state of cutting of a workpiece according to a modified example of the machine tool of FIG. 1.

Also, the open/close valves 66a, 66b are provided in the piping components 65a, 65b and control of the opened/closed states enables switching between the collection of the cutting fluid L and discharging of the cleaning fluid. Alternatively, as illustrated in FIG. 5, the switching may be implemented by movement of a switching plate 68 which has through holes 67a, 67b.

Figure 6:
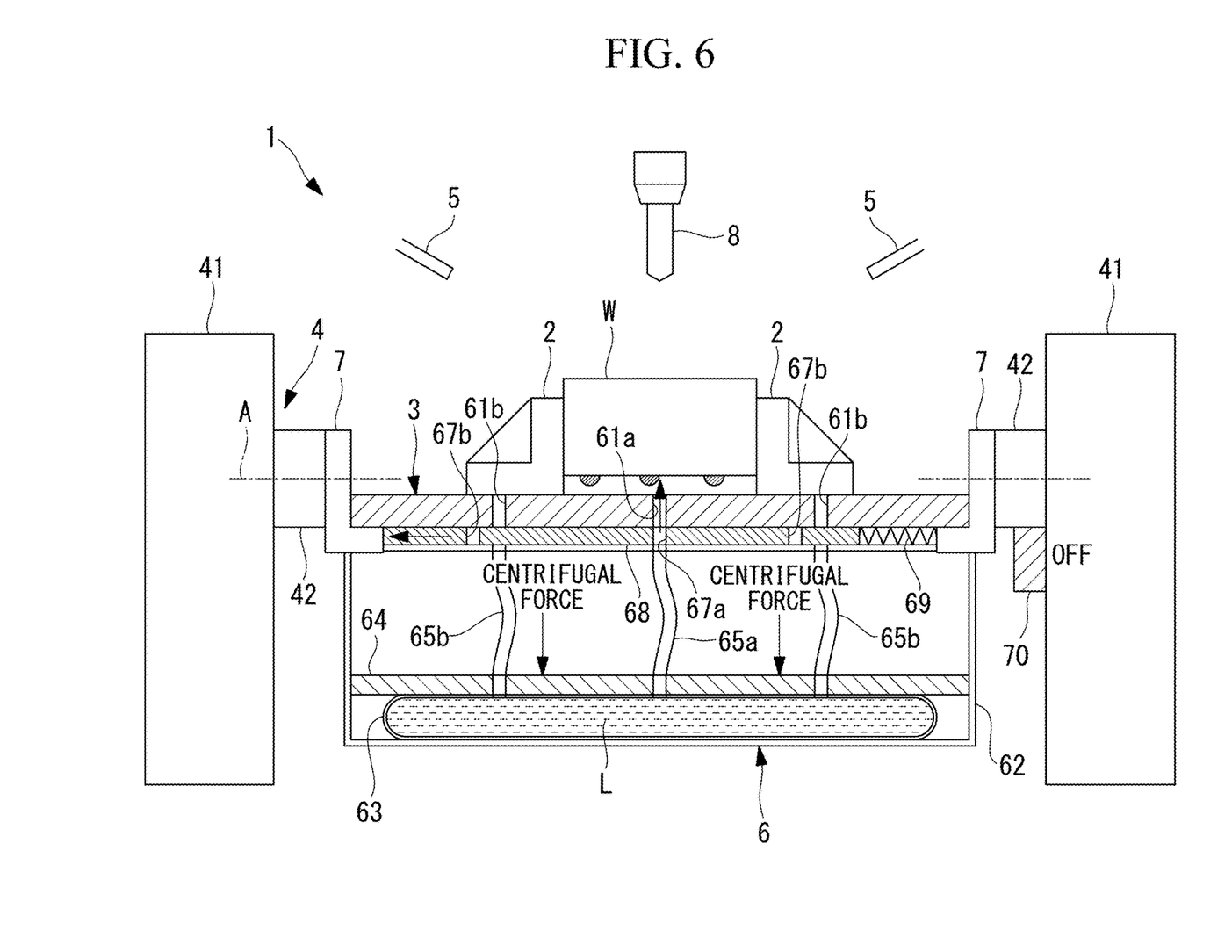
FIG. 6 is a diagram illustrating a state during cleaning of the workpiece using the machine tool of FIG. 5.

In other words, the switching plate 68 is supported movably between a first position and a second position in close contact with the surface of the table 3, and the switching plate 68 is movable in a direction parallel to the surface of the table 3. The switching plate 68 includes, as illustrated in FIG. 5, through holes 67b provided at positions which are aligned with the drainage through holes 61b when the switching plate 68 is arranged at the first position; and, as illustrated in FIG. 6, a through hole 67a provided at a position which is aligned with the cleaning through hole 61a when the switching plate 68 is arranged at the second position.

The switching plate 68 is made of, for example, a magnetic material and is biased to be arranged at the second position with respect to the table 3 by a spring 69 arranged between the table 3 and the switching plate 68.

Also, an electromagnet 70 is arranged outside the switching plate 68 and the switching plate 68 can be move to the first position by actuation of the electromagnet 70.

By virtue of this, the table 3 is placed in a substantially horizontal state, the electromagnet 70 is actuated, the switching plate 68 is moved to the first position to open the drainage through holes 61b at the time of the cutting and, at the time of the cleaning, the actuation of the electromagnet 70 is stopped, the switching plate 68 is moved to the second position by the spring 69 to close the drainage through holes 61b, the cleaning through hole 61a is opened, and thus the cleaning fluid, which is the cutting fluid L, can be sprayed.

Also, as the actuator that moves the switching plate 68, a hydraulic cylinder or an air cylinder may be adopted in place of the electromagnet 70.

Also, while the storage space is sealed by the rubber bag 63 in this embodiment, a sealing part may be alternatively provided which seals the interface between an inner surface of the container unit 62 and an outer edge of the movable member 64 and the cutting fluid L may be directly collected into the container unit 62.

Also, while the example has been described in which the piping components 65a, 65b are flexible, it is also possible to alternatively adopt a telescopic piping component extended and contracted through movement of multiple rigid cylinders sealed with respect to each other.

The following aspects are derived from the above disclosure.

An aspect of the present invention is a cleaning device arranged in a table to which a jig that supports a workpiece is fixed, the table configured to be rotated about a horizontal axis line, the cleaning device including:

one or more cleaning through holes provided in the table and opened at positions facing the workpiece or the jig; a container unit provided in the table and including a storage space which receives cleaning fluid; a movable member that is arranged in the container unit, that defines the storage space, and that is supported movably in a direction intersecting the horizontal axis line; and a cleaning piping component connecting the storage space and the cleaning through holes.

According to this aspect, the jig that supports the workpiece is fixed to the table and, when the table is rotated about the horizontal axis line after the cutting has been performed, then the container unit provided in the table is rotated together with the table about the horizontal axis line. The cleaning fluid is stored in the storage space of the container unit and, when the container unit is rotated, then a centrifugal force acts upon the movable member which defines the storage space.

Since the movable member is supported so that it is movable relative to the container unit in the direction intersecting the horizontal axis line, the movable member is caused to move to compress the storage space. By virtue of this, the cleaning fluid stored in the storage space is discharged, via the cleaning piping component, from the cleaning through holes provided in the table. Since the cleaning through holes are opened at the positions facing the workpiece or the jig, the cleaning fluid that has been discharged is sprayed onto the surface of the workpiece or the jig facing the table, and the chips adhering thereto can be cleaned off.

In the above-described aspect, the cleaning device may further include one or more drainage through holes that are provided in the table and allow a cutting fluid sprayed to the workpiece during cutting of the workpiece to pass therethrough; a drainage piping component that interconnects the storage space and the drainage through holes; and a drainage valve that opens and closes the drainage piping component.

By virtue of this configuration, when the drainage valve is actuated to place the drainage piping component in an opened state, the cutting fluid that was sprayed during the cutting of the workpiece is discharged from the drainage through holes, via the drainage piping component, and into the storage space of the container unit. In other words, the cutting fluid is stored as the cleaning fluid in the storage space.

Next, when the drainage valve is actuated to place the drainage piping component in a closed state and the table is rotated about the horizontal axis line, the cleaning fluid that has been stored in the storage space is discharged, via the cleaning piping component, from the cleaning through holes provided in the table onto the workpiece and the jig, and the chips adhering thereto can be cleaned off. When the drainage piping component is closed, the cleaning fluid can be concentrated into the cleaning through holes and cleaning can be performed efficiently.

Also, in the above-described aspect, the cleaning device may further include a cleaning valve that opens and closes the cleaning piping component.

By virtue of this configuration, the cleaning piping component is opened by actuation of the cleaning valve during the cleaning of the workpiece and the jig, the cleaning fluid from the storage space is discharged, and thus the cleaning of the workpiece or the jig can be carried out.

Also, in the above-described aspect, the cleaning device may further include a sealing part that seals the storage space in a liquid-tight state.

By virtue of this configuration, since the storage space is sealed in the liquid-tight state, it is made possible to allow the stored cleaning fluid to be discharged via the cleaning through holes without leakage to efficiently clean the workpiece or the jig.

Also, yet another aspect of the present invention is a machine tool that includes any one of the above-described cleaning devices.

Also, still another aspect of the present invention is a cleaning method including: storing cleaning fluid in a storage space provided in a table to which a jig supporting a workpiece is fixed; compressing the storage space by a centrifugal force created by rotation of the table about a horizontal axis line; and spraying the cleaning fluid stored in the storage space via one or more cleaning through holes provided in the table, the cleaning through holes opened at positions facing the workpiece or the jig.

According to the above aspects, an effect is achieved where it is made possible to clean off the chips remaining below the workpiece and the jig after the cutting.

REFERENCE SIGNS LIST 1 machine tool
2 jig
3 table
6 cleaning device
61a through hole (cleaning through hole)
61b through hole (drainage through holes)
62 container unit
63 rubber bag (sealing part)
64 movable member
65a piping component (cleaning piping component)
65b piping component (drainage piping component)
66a open/close valve (cleaning valve)
66b open/close valve (drainage valve)
A horizontal axis line
L cutting fluid (cleaning fluid)
W workpiece

The invention claimed is:

1. A cleaning device configured to work with a table to which a jig that supports a workpiece is fixed, the table being rotatable about a horizontal axis and the table having one or more cleaning through holes that open at positions facing the workpiece or the jig, the cleaning device comprising:

a container unit including a storage space which receives cleaning fluid;
a movable member in the container unity that defines a portion of the storage space, and that is supported so that it can move in a direction intersecting the horizontal axis; and
a cleaning piping component connecting the storage space and the cleaning through holes.

2. The cleaning device according to claim 1, wherein the table includes one or more drainage through holes that allow a cutting fluid sprayed to the workpiece during cutting of the workpiece to pass therethrough; the cleaning device further comprising:

a drainage piping component connecting the storage space and the drainage through holes; and
a drainage valve that opens and closes the drainage piping component.

3. The cleaning device according to claim 1, further comprising a cleaning valve that opens and closes the cleaning piping component.

4. The cleaning device according to claim 1, further comprising a sealing part that seals the storage space in a liquid-tight state.

5. A machine tool comprising the cleaning device according to claim 1.

6. A cleaning method comprising:
- storing cleaning fluid in a storage space in a container unit that rotates together with a table to which a jig supporting a workpiece is fixed and which is configured to be rotated about a horizontal axis;
- compressing the storage space by moving a movable member, which is arranged in the container unit, which defines a portion of the storage space, and which is supported movably in a direction intersecting a horizontal axis, by a centrifugal force created by rotating the table about the horizontal axis; and
- spraying the cleaning fluid stored in the storage space via one or more cleaning through holes, the cleaning through holes opened at positions facing the workpiece or the jig.

\* \* \* \* \*